US010656705B2

(12) United States Patent
Alleaume et al.

(10) Patent No.: US 10,656,705 B2
(45) Date of Patent: May 19, 2020

(54) ASSISTED ITEM SELECTION FOR SEE THROUGH GLASSES

(71) Applicant: INTERDIGITAL CE PATENT HOLDINGS, SAS, Paris (FR)

(72) Inventors: Vincent Alleaume, Pace (FR); Pierrick Jouet, Rennes (FR); Philippe Robert, Rennes (FR)

(73) Assignee: InterDigital CE Patent Holdings, SAS, Paris (FR)

(*) Notice: Subject to any disclaimer, the term of this patent is extended or adjusted under 35 U.S.C. 154(b) by 47 days.

(21) Appl. No.: 15/756,248

(22) PCT Filed: Jul. 22, 2016

(86) PCT No.: PCT/EP2016/067503
§ 371 (c)(1),
(2) Date: Feb. 28, 2018

(87) PCT Pub. No.: WO2017/036667
PCT Pub. Date: Mar. 9, 2017

(65) Prior Publication Data
US 2018/0253144 A1    Sep. 6, 2018

(30) Foreign Application Priority Data

Aug. 28, 2015 (EP) .................... 15306326

(51) Int. Cl.
*G06F 3/01* (2006.01)
*G06F 3/0482* (2013.01)
(Continued)

(52) U.S. Cl.
CPC ........... *G06F 3/013* (2013.01); *G02B 27/017* (2013.01); *G02B 27/0172* (2013.01);
(Continued)

(58) Field of Classification Search
CPC .... G06F 3/167; G06F 3/0488; G06F 3/04842; G06F 3/0482; G06F 3/04817;
(Continued)

(56) References Cited

U.S. PATENT DOCUMENTS

| 6,456,262 | B1* | 9/2002 | Bell | ................. A61B 3/113 345/472 |
| 2007/0296646 | A1* | 12/2007 | Yamamoto | ........... G02B 27/017 345/8 |

(Continued)

FOREIGN PATENT DOCUMENTS

WO    WO2015081334    6/2015

OTHER PUBLICATIONS

Cocker, G., "Hands on with Microsoft HoloLens and its AR Halo 5 demo at E3 2015", Wearable.com, http://www.wareable.com/microsoft/microsoft-hololens-review, Jun. 18, 2015, pp. 1-9.

(Continued)

Primary Examiner — Mihir K Rayan
(74) Attorney, Agent, or Firm — Invention Mine LLC

(57) ABSTRACT

An augmented reality (AR) interactive system and method is provided. In one embodiment the systems comprises a head mounted user interface configured to receive user input, a processor configured to manage data based on user input, a camera and a display. The camera and the display are in processing communication with one another and the head mounted user interface via the processor. The processor is configured to determine a user's field of view and a center of the user's field of view based on output of a sensor and rendering images for output to the display. Each of the images include one or more objects and a plurality of signs each corresponding to a selectable object in the user's field of view. The rendering of images include altering a first display attribute of a given sign of the plurality of displayed (Continued)

Assisted item triggering for
See through glasses signs based on determining that the user's field of view is centered on the given sign. The processor is also configured to select the given sign based on determining that the user's field of view remains centered on the given sign for an amount of time exceeding a threshold.

17 Claims, 3 Drawing Sheets

(51) Int. Cl.
*G02B 27/01* (2006.01)
*G06F 3/0481* (2013.01)
*G06F 1/16* (2006.01)
*G06F 3/0484* (2013.01)
*G06F 3/0488* (2013.01)
*G06T 11/60* (2006.01)
*G06F 3/16* (2006.01)

(52) U.S. Cl.
CPC ........ *G02B 27/0179* (2013.01); *G06F 1/163* (2013.01); *G06F 3/011* (2013.01); *G06F 3/012* (2013.01); *G06F 3/0482* (2013.01); *G06F 3/0488* (2013.01); *G06F 3/04815* (2013.01); *G06F 3/04817* (2013.01); *G06F 3/04842* (2013.01); *G06T 11/60* (2013.01); *G02B 2027/014* (2013.01); *G02B 2027/0123* (2013.01); *G02B 2027/0138* (2013.01); *G02B 2027/0141* (2013.01); *G02B 2027/0178* (2013.01); *G02B 2027/0181* (2013.01); *G02B 2027/0187* (2013.01); *G06F 3/167* (2013.01)

(58) Field of Classification Search
CPC ...... G06F 3/04815; G06F 3/013; G06F 3/012; G06F 3/011; G06F 1/163; G02B 2027/0187; G02B 2027/0181; G02B 2027/0178; G02B 2027/0141; G02B 2027/014; G02B 2027/0138; G02B 2027/0123

See application file for complete search history.

(56) References Cited

U.S. PATENT DOCUMENTS

| | | | |
|---|---|---|---|
| 2009/0128449 A1* | 5/2009 | Brown | G06F 3/012 345/8 |
| 2010/0313124 A1* | 12/2010 | Privault | G06F 3/04812 715/702 |
| 2012/0038670 A1* | 2/2012 | Choi | G06T 19/006 345/633 |
| 2013/0328925 A1 | 12/2013 | Latte et al. | |
| 2013/0335405 A1 | 12/2013 | Scavezze et al. | |
| 2014/0372957 A1 | 12/2014 | Keane et al. | |
| 2014/0375683 A1 | 12/2014 | Salter et al. | |
| 2015/0135132 A1* | 5/2015 | Josephson | G06F 3/0236 715/784 |
| 2015/0212576 A1 | 7/2015 | Ambrus et al. | |
| 2015/0323990 A1* | 11/2015 | Maltz | G02B 27/0179 345/173 |

OTHER PUBLICATIONS

Davies, C., "HoloLens hands-on: Building for Windows Holographic", SlashGear.com, http://www.slashgear.com/hololens-hands-on-building-for-windows-holographic-01381717/, May 1, 2015, pp. 1-18.

Anonymous, Sony Releases the Transparent Lens Eyewear "SmartEyeglass Developer Edition", Sony News Release, http://www.sony.net/SonyInfo/News/Press/201502/15-016E/, Feb. 17, 2015, pp. 1-5.

Stein, S., "Epson aims for eyes and heart: Moverio BT-200 Smart Glasses and line of heart-rate-monitor fitness devices, hands-on", CBS Interactive Inc., http://www.cnet.com/products/epson-moverio-bt-200/preview/, Feb. 18, 2014, pp. 1-6.

* cited by examiner

ASSISTED ITEM SELECTION FOR SEE THROUGH GLASSES

This application claims the benefit, under 35 U.S.C. § 365 of International Application PCT/EP2016/067503, filed Jul. 22, 2016, which was published in accordance with PCT Article 21(2) on Mar. 9, 2017, in English, and which claims the benefit of European Patent Application No. 15306326.8 filed Aug. 28, 2015.

1. TECHNICAL FIELD

The present disclosure relates generally to an augmented reality interactive system and more generally to an augmented reality interactive system using see through glasses.

2. BACKGROUND

This section is intended to introduce the reader to various aspects of art, which may be related to various aspects of the present invention that are described and/or claimed below. This discussion is believed to be helpful in providing the reader with background information to facilitate a better understanding. Accordingly, it should be understood that these statements are to be read in this light, and not as admissions of prior art.

Augmented reality (AR) systems create immersive environments that provide integrated live views of a physical scene with one or more augmented elements are computer generated. AR systems incorporate sensory input such as sound, video, graphics, smells, haptic feedback or other such data. In this way the real world information available to a user can be further enhanced through digital manipulation and processing and the user's environment and its surrounding objects can be overlaid by digitally enhanced components. In recent years, augmented reality systems worn by the user have gained popularity due to their portability and ease of use. See through or smart glasses are one the most popular form of such systems. Unfortunately, the users of these glasses have encountered many problems since the technology that enables their use have shortcomings. For example, many glasses only work well when the user looks through them at a specified angle. Providing user input has also been challenging especially in cases where objects fully or partially occlude one another. Other serious problems also exist as smart glasses provide limited functionality.

Consequently, it is important to provide accurate data and process user input in an optimized manner and which also provides the user an exceptional immersive experience.

3. SUMMARY

An augmented reality (AR) interactive system and method is provided. In one embodiment the systems comprises a head mounted user interface configured to receive user input, a processor configured to manage data based on user input, a camera and a display. The camera and the display are in communication with one another as are the head mounted user interface via the processor. The processor is configured to determine a user's field of view and a center of the user's field of view based on output of a sensor and rendering images for output to the display. Each of the images include one or more objects and a plurality of signs each corresponding to a selectable object in the user's field of view. The rendering of images include altering a first display attribute of a given sign of the plurality of displayed signs based on determining that the user's field of view is centered on the given sign. The processor is also operative to select the given sign based on determining that the user's field of view remains centered on the given sign for an amount of time exceeding a threshold.

In another embodiment, a method of item selection using an augmented reality head mounted user interface having a user interface configured to receive user input is provided that comprises determining via processor a user's field of view and a center of the user's field of view and rendering images for output to a display, each said image including one or more objects and a plurality of signs each corresponding to a selectable object in the user's field of view, the rendering of images including altering a first display attribute of a given sign of the plurality of displayed signs based on determining that the user's field of view is centered on the given sign. The method also comprises selecting the given sign based on determining that the user's field of view remains centered on the given sign for an amount of time exceeding a threshold.

In yet another embodiment an augmented reality (AR) interactive system is provided, comprising user interface means for receiving user in form a of voice, movement or touch and means for displaying images in processing communication with said user interface means and a processor. The processor is operative to perform determining a user's field of view and a center of the user's field of view based on output of a sensor and rendering images for output to the display, each image including one or more objects and a plurality of signs each corresponding to a selectable object in the user's field of view, the rendering of images including altering a first display attribute of a given sign of the plurality of displayed signs based on determining that the user's field of view is centered on the given sign. The processor is also operative to select the given sign based on determining that the user's field of view remains centered on the given sign for an amount of time exceeding a threshold.

Additional features and advantages are realized through the techniques of the present invention. Other embodiments and aspects of the invention are described in detail herein and are considered a part of the claimed invention. For a better understanding of the invention with advantages and features, refer to the description and to the drawings.

4. BRIEF DESCRIPTION OF THE DRAWINGS

The invention will be better understood and illustrated by means of the following embodiment and execution examples, in no way limitative, with reference to the appended figures on which:

Figure 1:
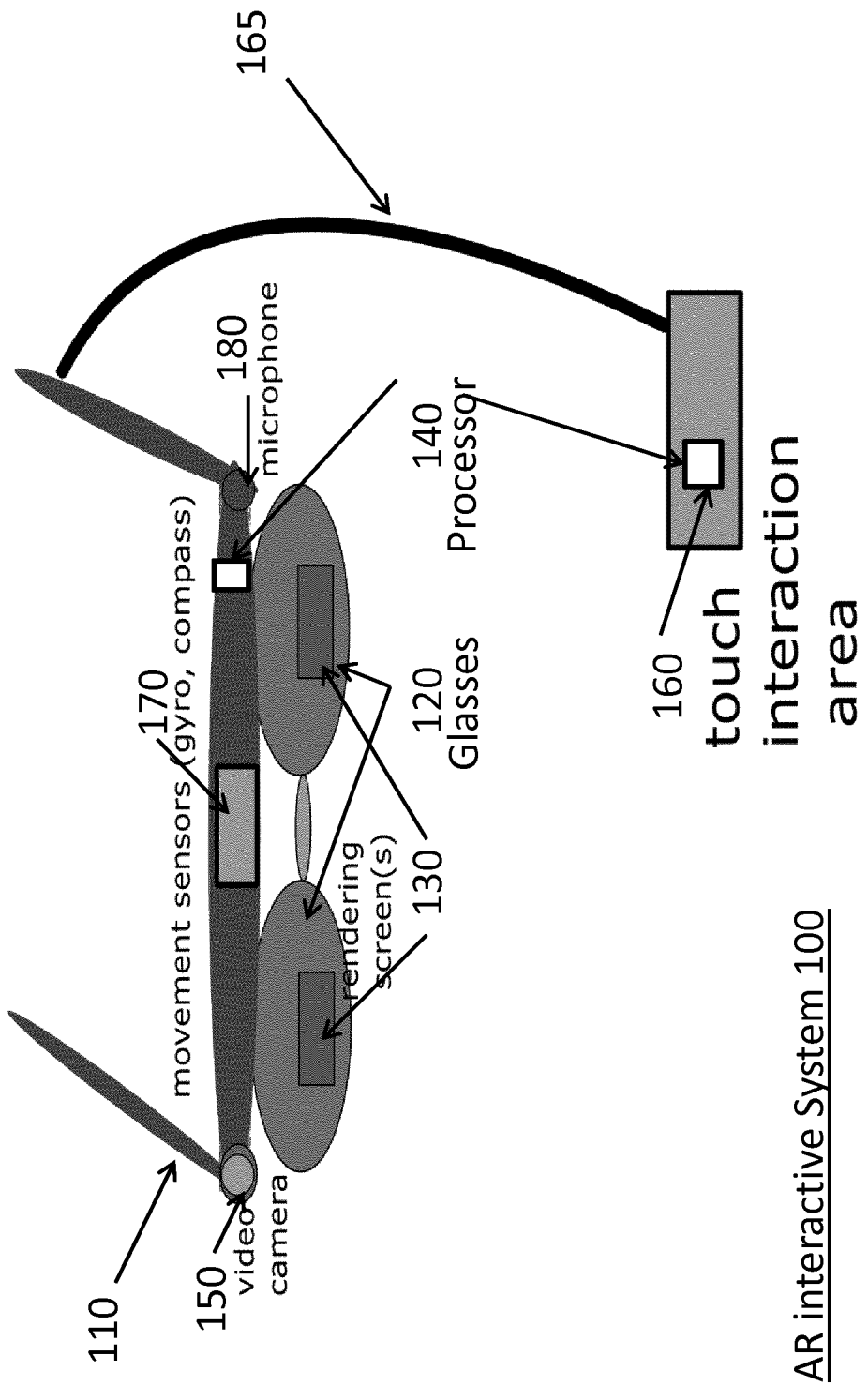
FIG. 1 depicts an augmented reality (AR) interactive system in accordance with an illustrative embodiment.

In FIGS. 1-3, the represented figures provide examples that are purely functional entities and do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

5. DESCRIPTION

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modification.

FIG. 1 is a depiction of an augmented reality (AR) interactive system 100 as per one embodiment. The augmented reality interactive system 100 comprises a processor 140 that is in conjunction with a user interface and a display. The user interface in FIG. 1 comprises of different components that can receive user input in different forms such as touch, voice and body movement. In alternate embodiments, other user input can be added or alternatively one or a subset of them can be accepted.

The user interface in the embodiment of FIG. 1, comprises a head mounted user interface (also referred as a head mounted device) 110 in communication with a touch interactive area 160, sensor(s) 170, camera(s) 150 and microphone(s) 180 via the processor 140. The sensor(s), in one embodiment can be a motion sensor but in other embodiments, the sensor(s) can be one of a variety of sensors that react to light, heat, moisture and/or also include gyros and compass components.

In the example depicted in FIG. 1, a plurality of processors 140 are provided that are also in communication with one another. As way of example, the processors are embedded in different areas, one in the touch interaction area 160 and another one in the head mounted components 110. However, this is only one embodiment. In alternate embodiments, only one processor can be used and the processor may be freestanding. In addition, the processor(s) can be in processing communication with other computers or computing environments and networks. In FIG. 1, the camera 150 (such as a video camera) and the microphone(s) 180 can also be used to provide the user with augmented reality images and sounds. In one embodiment, the microphone can provide input to a processor or a processing system. One or more speakers (i.e. loudspeakers) may also be used to provide enhanced sound to the user to increase the immersive augmented reality experience. In one embodiment, the speakers may be included in the head mounted user interface or they may be provided as a separate entity, or even attached to other components.

In the embodiment of FIG. 1 the head mounted user interface 110 comprises a pair of see through glasses that include a screen referenced as rendering screen 130. The glasses, in one embodiment, may be ordinary glasses that are being worn by a user and rendering screens may be permanently and/or temporarily be added to them for use with the AR system 100.

Head mounted user interfaces, and in particular see-through glasses offer the advantages that if enabled correctly they can provide the user both adequate privacy and portability. Unfortunately, the prior art still requires traditional user interface devices to be used by these glasses in that they either require a small touch area or a vocal control mode. Any gesture recognition features are very basic if existent at all but have the greater drawback of being riddled with cumbersome setups that are not user friendly.

While in the embodiment of FIG. 1, a touch interaction area is provided, this is for example only and the component is not necessary. In fact, in one embodiment, there is no need for any touch interaction area. User interface can be provided through voice, camera or one or more sensors such as a motion sensor that are enabled to register gestures without any cumbersome additional setups. For example, user may be provided a user input virtually and be just pointing to it such that it appears the user is typing or pointing to nonexistent physical objects in the air to those that are not sharing the same virtual reality environment. In another embodiment, a keyboard may appear on the user's hand and the user may provide the input by using his/her other fingers to press on his/her own hand to make such selection.

Conventionally, many users' interactions with multimedia devices such as computers, mobile devices such as tablets and smartphones, and others are performed by user interfaces such as keyboards, mouse, touch screen and the like. As technology improves, some of these interaction modes may become unattractive or cumbersome. For example, while a user is traveling the freedom of movement is important but traditional user interfaces and user connections may not always be available. While voice commands is an attractive means of providing user input from a mobility point of view, voice commands have certain drawbacks in situations where privacy is of paramount concern. In other situations a variety of different seemingly similar to distinguish objects may also present issues when using voice commands.

Selecting dedicated touch areas also present their own challenges. In order to allow for maximum mobility, size of touch areas has to be kept at a minimum. For example, the touch area may be designed to be placed on the handles of the glasses. The challenge of keeping such areas relatively small, may lead to the placement of the touch are either to be inconveniently located or that the size may limit the ability to control the pointer movement needed in many applications. This in turn will also affect the field of view of the user and keep it very narrow (i.e. less than or equal to 30° in current prior art). This is because the field of view of an augmented reality environment is defined in terms of the remaining (real) scene as viewed through the see-through glass. The end result does not allow user pointing outside that small area and limit most of what the user is seeing (cannot be pointed at without finally moving the head).

In one embodiment, the head mounted user interface 110 can be manufactured to house or physically connect the components discussed such as the microphone, video camera, touch interaction area, rendering screen, speakers and others. Some of these components may be provided separately but provided in one housing unit conveniently in some embodiments. For example, the touch interaction area 160 can be attached to the head mounted user interface 110 with an attachment 165. The attachment can be retractable and the interaction area itself may be provided in a complementary compartment in the head mounted user interface 110 in some embodiments. This will allow the touch area, when needs to be used, to have an adequate foot print. In one embodiment, for example, the touch area may be folded out and disposed in the head mounted user interface when not necessary.

Alternatively, some of the components may be connected or collocated or housed in other embodiments as can be appreciated by those skilled in the art. Other embodiments can use additional components and multiple processors, computers, displays, sensors, optical devices, projection systems, and input devices that are in processing communication with one another as can be appreciated by those skilled in the art. Mobile devices such as smartphones and tablets which may include one or more cameras, micromechanical devices (MEMS) and GPS or solid state compass may also be used. As indicated, FIG. 1 is provided as an example but in alternative embodiments, components can be substituted and added or deleted to address particular selections preferences and/or needs. In addition, one component may be substituted for assuming it provides similar functionality. For example, the touch interaction area 160 may be substituted with a mobile device, such as a cell phone or a tablet to provide one or more processors. As also indicated with respect to the glasses, this interchangeability allows the users to incorporate everyday objects and devices that are used in conjunction with other ordinary uses into the system 100 to take full advantage or usability and portability. Furthermore, the head mounted user interface 160 can be one of many alternatives that embed or allow the user to see a private screen through specialty lenses and may be a part of a head-mounted display (HMD), a headset, a harness, a helmet or other wearable and non-wearable arrangements as can be appreciated by those skilled in the art. In the alternative, none of the components may be connected physically or a subset of them may be physically connected selectively as can be appreciated by those skilled in the art.

Referring back to the embodiment of FIG. 1, the sensor(s) 170, rendering screen or display 130, microphone(s) and camera 150 together as used in FIG. 1, are aligned to provide virtual information to the user in a physical world capacity and will be responsive to adjust accordingly with the user's head or body movements to allow for an immersive and mobile experience. In addition, in the embodiment of FIG. 1, the eyeglasses 120 and their display 130 (rendering screen) can include and are in communication with a camera 150, in one embodiment a video camera, in order to intercept the real world view and re-display its augmented view through the eye pieces. The real or virtual imagery can then be projected through or reflected off the surfaces of the eyewear lens pieces as can be appreciated.

See-Through glasses are specifically suited to be incorporated with augmented reality technology as they can mix real elements of a scene with additional virtual elements. The problem, however, is that the field of (augmented reality) view is often very limited and at most is no better than a 30° degree horizontally. In the example of FIG. 1, for this purpose, a see through glass is provided at 120 but in other embodiments, other similar components are used as can be appreciated by those skilled in the art. In the example of FIG. 1, the see through glasses, includes both a display and a video capture component through the video camera 150 as shown. The video camera 150 can be very small, in one embodiment, but still enabled to acquire part of the real scene from a viewpoint close to the user's eyes (but not exactly the same). In one embodiment, the glasses may be made up of several layers, for example of blue, green and red and one or more light sources may be provided next to the glasses to project light into the head mounted user interface or glasses. In one embodiment, small corrugated grooves may be also provided in each layer of glass to diffract light particles, in order to deceive user of real depths and distances to create virtual objects that seem real.

A problem that presents itself has to do with complex situations where visual components are presented in a small footprint. Selecting these objects that compete with one another becomes difficult at times when user input requires some high level of interaction. In such situations improper selection of objects due to occlusion or the pointer size being small or other similar situations as discussed lead to poor management of data. In situations where selecting precisely one of a few of such objects that compete with one another for limited footprint will limit choice of user interface. The situation becomes even more complex, if the user is only allowed to point at real/virtual object(s) only based on the camera angle and portrayed image processing. Since this viewpoint that is not exactly the same one of the own user's eyes, the task becomes error prone in the absence complex scenery especially when very close or self-occluding objects are present.

Another problem lies in the creation of accurate eye tracking systems and their ability to provide reliable track gaze analysis. Prior art devices have a very limited field of view and require more hardware and dedicated processing. This means that if the user, for example, is looking at a virtual table and tilted his/her head to one side, the user would cut off half of the view of what was happening on the table. In fact, in such circumstances, user has to ensure that their gaze remains centered at all times, otherwise the user would not see everything that is happening on the table.

As with all electronic devices, there is need to balance between providing freedom of movement for the user and the availability of function that can be provided. In other words by not providing any cable that is attached between the head mounted unit such as glasses and a remote and often distant processing unit, the bandwidth to transmit data may be impacted as does the available power. Consequently, the final augmented reality experience as seen from the user perspective may be impacted due to bandwidth and power limitations, even though the freedom of movement is preserved. In addition, allowing a user trigger some use case interaction in an augmented reality context while wearing see-through glasses or other head mounted user interfaces may also be challenging for other reasons. For example measuring the pose and orientation of the glasses or head mounted unit using embedded sensors, especially ones that incorporate compass, gyroscopes and other similar devices, may not provide the accuracy needed. This is because when the user is not looking straight forward, the prior art has not provided a way that is sufficiently accurate in deducing the direction of the user look. To complicate it even further, using the video of the camera attached can be at times complex and may not always produce accurate results since the user's view can be distorted due to the user viewing the world through glasses or other similar means. This can even affect displaying virtual objects to the user, because these objects will be presented to the user with an affected position depending on the one estimated previously that was calculated from the user's point of view wearing such glasses or other items.

Figure 2A:
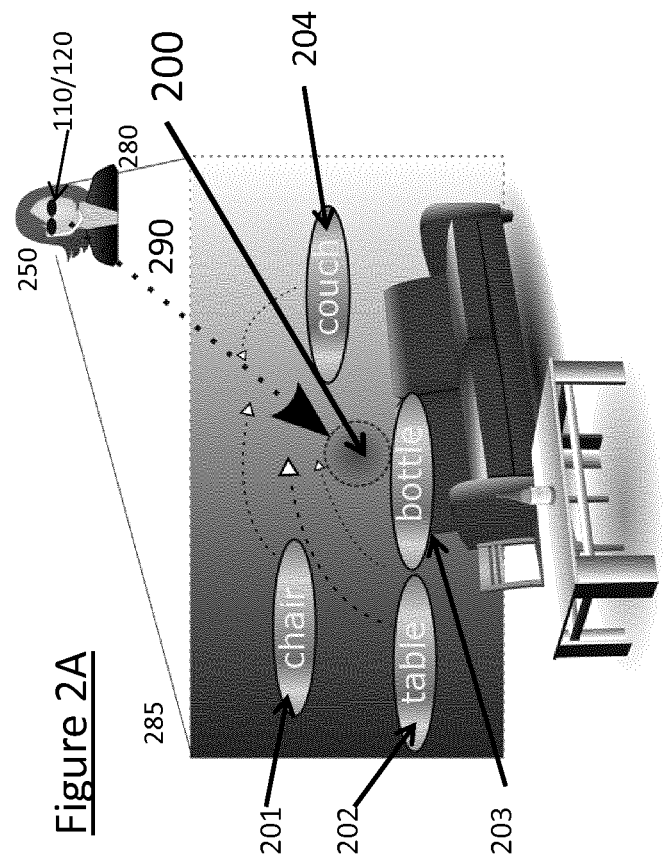
FIG. 2A depicts an illustration of a user view using an augmented reality interactive system such as the one shown in embodiment of FIG. 1.

In one embodiment as will be discussed in conjunction with FIGS. 2 and 3, the issues related of object selection in competing footprints are resolved by allowing assisted item triggering. In the embodiment of FIGS. 2 and 3 as will be discussed, an optimized layout of signs and thumbnails representing real or virtual objects is presented that will facilitate interaction relating to such competing objects by managing any occlusion of these objects, especially as seen from the user point of view. To aim better understanding, an example is presented in depiction of FIG. 2A.

FIG. 2A provides an illustration where a user 250 is wearing a head mounted user interface 110 which in this case can includes a pair of see-through glasses 120. In this example, the user's glasses or head mounted user interface may either be a free standing unitary device or be part of a larger and more sophisticated system that is in communication with one or more local or remote computing networks. The scenery depicted in FIG. 2A is supposed to reflect the user's view. As illustrated the user's view depicted illustrates a living space, possibly from inside a house, and includes partially occluded views of a table/desk and an associated chair. The view also includes the image of a bottle placed on top of the table/desk and the bottle appears to be in front of a couch. Some object(s) may be virtual object(s) that can be added in such a scene following a related use case. The user's direct view is identified by the dash lines and arrows 290 and the scope of user's periphery limit and range and limit is provided by lines 280 and 285 respectively.

A specific neutral central region or object is identified as 200. The allocation of this neutral central region or object, as will be discussed, in one embodiment allows easy selection of competing or occluded objects by eliminating adverse interaction between very close real or virtual objects (from a viewing point of view). This also reduces or eliminates head movements where gestures and user movement is used as a user selection interface. The objects, as will be discussed, can be either equally real objects that are recognized via image processing or they can be virtual objects that are inserted in the scene.

In one embodiment, the central region or object 200 needs to be at least partially visible and reachable via a centered user interface activated pointer. In this example, the user is shown looking in the direction of a part of the room where a couch is situated and it is the user's gaze and eye movement that provide the user interface activated pointer through movement.

In one embodiment, as shown in FIG. 2A, a series of signs and or thumbnails are dynamically displayed on the screen and are depicted by reference numbers 201 to 204. These signs and/or thumbnails are associated each with different displayed or identified items such as the couch and the table as shown. It should be noted that as can be appreciated by those skilled in the art, thee signs and/or thumbnails are only used in this embodiment to aid understanding. Therefore, in other embodiments similar other components may be used instead of signs and/or thumbnails such as but not limited to object names, images of objects, icons, idealized object images and others. In one embodiment, the signs and/or thumbnails may be initially displayed in a loose or sparse layout, such that while they are all displayed on the user's screen or display but such they do not overlap with each other. This will allow each sign and or thumbnail to appear distinctly even when their associated object may be almost fully or partially occluded when seen from the user point of view.

In one embodiment, the thumbnails and/or signs are self-arranging and may at least initially be equally distributed around the central pointer or the central region or object 200 in the user's field of view. (In one embodiment, the central pointer and the central region or object 200 are different while in another embodiment they may be represented by the same entity). The pointer is superimposed on the (glass) display and fixed with respect to the user interface and the scene while the user moves and changes body or head position. When there is a separate central pointer, the pointer and/or the central region may each also be represented by specific symbols, such as an empty sign or dedicated thumbnail. The central region 200 serves as symbolic representation of a neutral area, such that no object can interact with it. The purpose of the central region 200 is to keep its neutrality of position while other items around it move and get triggered. The move, in one embodiment, may resemble a slow gathering. In other words the central region is treated as a non-actionable object. In other embodiments, for other reasons, there may be other thumbnails and/or signs that are also designated as non-actionable items. In one embodiment, if the user completely looks away from an area, the sign or thumbnail that belongs to the item gathered will slowly ungather from others and finally disappear, letting other signs and thumbnails to have more area to rearrange themselves.

Figure 2B:
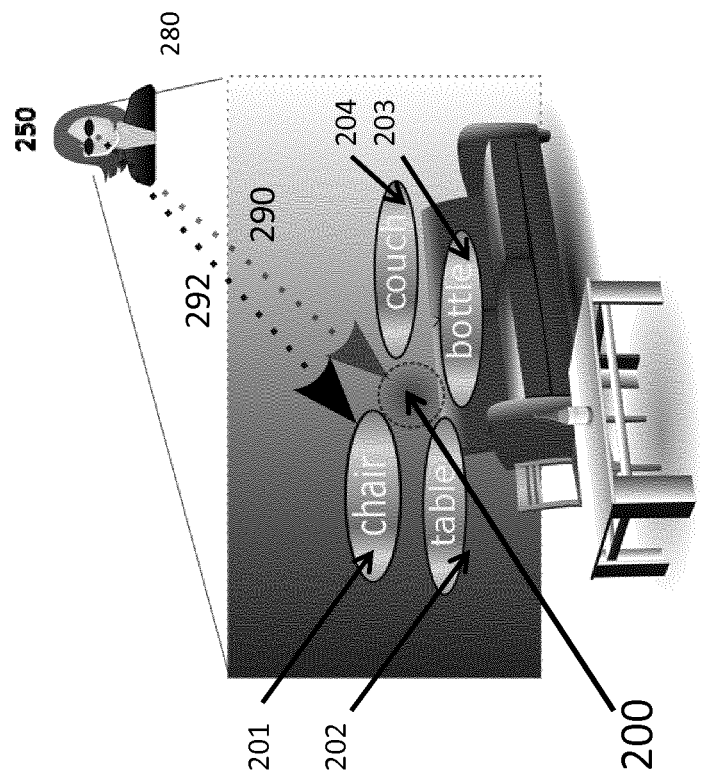
FIG. 2B depicts an illustration of a user view with auto arranging and center converging signs signaling real/virtual object(s) system in accordance with an illustrative embodiment.

FIG. 2B as will be discussed provides a next stage processing depiction of the embodiment of FIG. 2A. Considering FIGS. 2A and 2B together, the user will see the actionable objects that are present in the close vicinity of his viewpoint, using their thumbnails or signs, slowly converging toward the user's center of viewpoint, while still not overlapping. It should be also noted that the central area 200 also remains distinct and not being occupied by another selected thumbnail or sign. Referring back to FIG. 2A, the actionable items are displayed around the central area (and pointer here) 200 which is designated as non-actionable and non-interaction item. The movement of items from FIG. 2A to FIG. 2B is shown accordingly by the arrows and dashed curved lines (in FIG. 2A).

In FIG. 2B the thumbnails and signs have all converged around the neutral object or region 200 as shown. The user's point of view is shifted slightly from 290 to 292. A variety of situations may be rendered in FIG. 2B. In one example, the user intentionally changes the point of view and in another example the user's head has moved for a variety of different reasons such as readjusting on a chair or shifting body contour from a first to a second positon. Whatever the reason, once the new user position shown signs that the new position is stabilize, the layout of the example in FIG. 2B can ensue when resting for a while in that position. As can be seen, the thumbnails or signs associated to objects close to the user's view, have are progressively moved toward the center of the user's viewpoint and but still around the neutral area or region 200, but still without overlapping.

In one embodiment, there is a continuous accounting of the user's view point and direction as it may shift. This can be accomplished by a variety of mechanisms as can be appreciated by one skilled in the art. For example, there may be a sensor disposed in the head mounted user interface or glasses with a motion detector (sensor) or other such means. In a different example, the camera image itself may be used. In one embodiment, the see through glasses may be used to track the position that the user is pointing to, namely the specific virtual or real object. This latter embodiment will reduce the need to provide any required head movements or at least reduce the movement range. In this embodiment, user's simply glancing by pointing that option and selecting it by similar means will trigger selection action. It should be noted, however, that the user may change its view point but the selection will not be made even if the user continues looking in that direction unless the user actively chooses the object. This can be accomplished, in one embodiment, by providing object selection using a delayed signs' layout object as will be discussed. This concept can be incorporated in to the embodiment of FIG. 2B to aid further understanding.

Figure 3A:
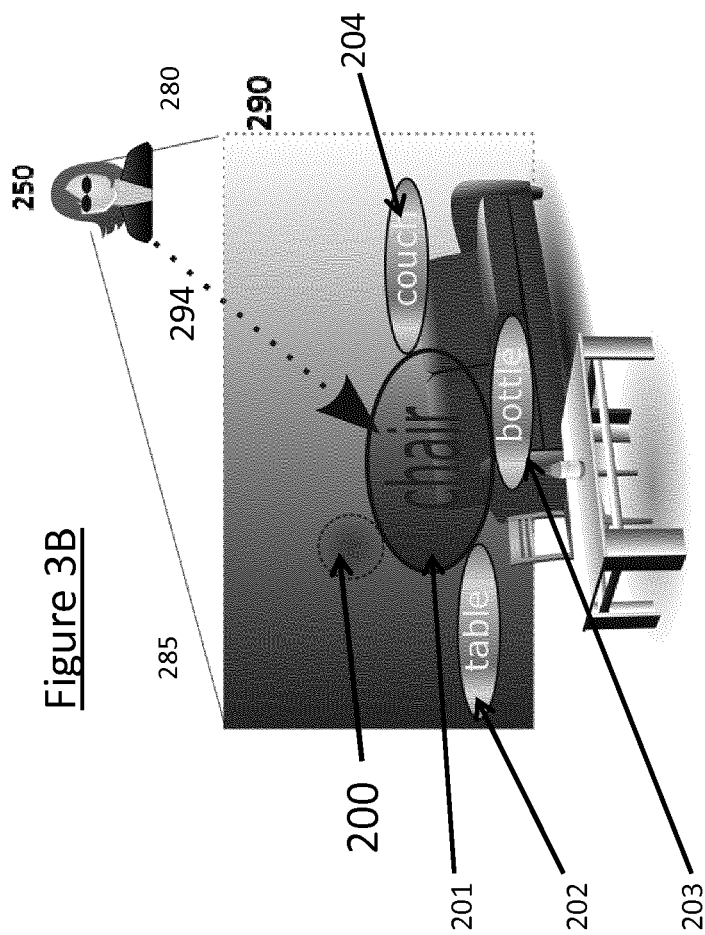
FIG. 3A is an illustration of one embodiment illustrating a user just prior to item selection triggering and FIG. 3B provides a depiction of the same embodiment of FIG. 3A but after item selection was triggered.

In FIG. 2B, as shown, the user has changed its position and moved his/her head. The new view and angle is depicted by reference number 292 and is being compared to the old position 290 as demonstrated in the figure. The signs and/or thumbnails 201 to 204 have moved accordingly around the still central region 200. In one embodiment, central region 200 (in his viewpoint) and the thumbnails or signs 201 to 204 will move accordingly (to the change in viewpoint) but with a small and intentional delay. The delay, in this embodiment, will allow the user to eventually center his/her gaze on a close thumbnail or sign, which may possibly have not yet stabilized completely and that may still be slightly converging to the previous relative pointer location. The central region 200 and/or a central pointer as well as operation sign and/or thumbnails 201 to 204 will be switching their respective position accordingly. The signs and/or thumbnails as well as the central neutral region and pointer will eventually stabilize after some time. In one embodiment, the delay time can be adjustable and preselected by the user to slow or speed up the reaction time of the augmented reality system 100. Once this appropriate period passes, the user can then make a user selection as displayed in the next stage process step of FIG. 3A. In FIG. 3A, as can be seen there is still a shift in the positions.

In a similar other example, the user wants to interact with one of the signaled or thumb nailed objects 201 to 204. In this embodiment, the user does not need to do a wide head movement to center its viewpoint to that (possibly occluded) object, but instead the user simply needs to slightly move his/her head to correct pointer toward the-incoming or stabilized selected thumbnail or sign that is related to that object. Then, keeping his viewpoint centered on that sign for a moment, the sign will grow in size as discussed before.

In each case as shown, the size of the thumbnail or sign 201 that represents the chair has grown in size as it becomes more obvious that that object may be selected. Comparing the size of the thumbnail for the chair 201 in FIGS. 2 and 3, will show the growing size of this thumbnail. While in this example, the growing size is picked to represent the possible selection, other similarly differentiating attributes can be used such as color, brightness, sparkling or blinking or other such visually differentiating features. In addition, the possible selection of the chair 201 has also caused the other signs and the layout to be shifted and swapped as shown in one embodiment.

Figure 3B:
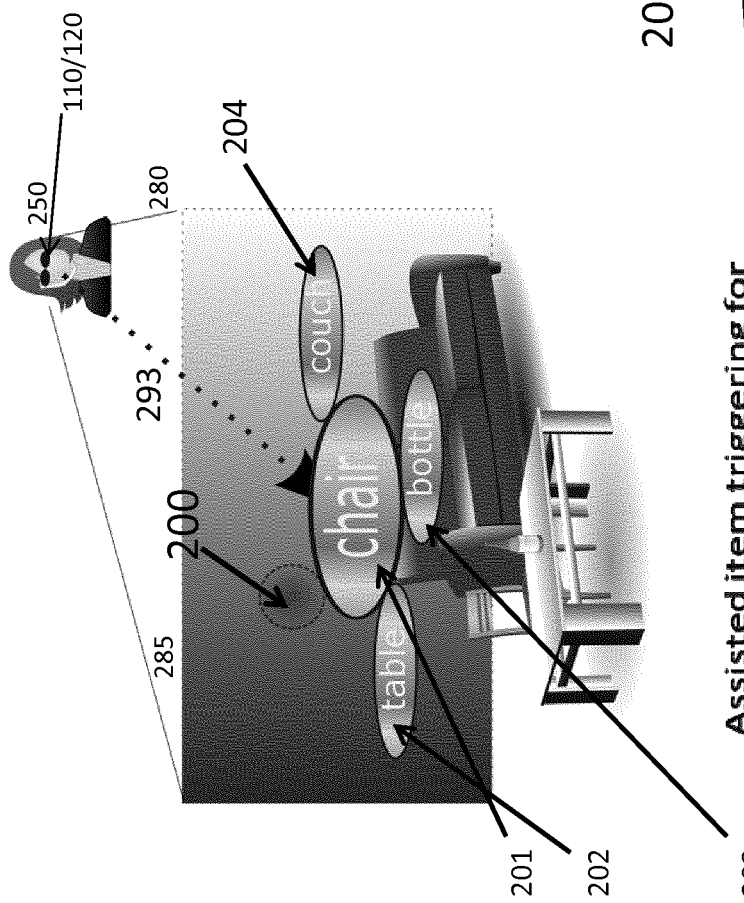

FIG. 3B shows the next stage processing step after the selection action has been triggered. Considering the embodiments of FIGS. 3A and 3B together, the user decides on selecting the chair and the thumbnail 201 will grow in size until it is triggered as a selected object. In the embodiment of FIG. 3B, the selection trigger is accompanied by a change in the color and darkness of the thumbnail or sign of the chair 201. However, in other embodiments, as can be appreciated, the selection and triggering can be identified in a variety of different ways. Some examples may include color change (green to red, blue to yellow etc.) or other similar contexts as can be appreciated with one skilled in the art. For example, the sign or thumbnail may start blinking just prior to selection and once the selection is made a halo forms around it. In other embodiments, several changes may occur. For example, all thumbnails may appear originally in one color, for example green, and they slowly change from green to yellow (FIG. 2B to 3A) to show possible selection being made. The thumbnails also grow in size or start blinking or are identified in other ways. Once the final selection action is triggered then thumbnail then changes to a different color (red) and may even change shape (oval to square etc.). As discussed, color is only one such indicator. In another embodiment, the sing may be swapping place between the previously centered signs (typically neutral sign) and the new selected sign. Other indicators, may include but are not limited to blinking, growing, glowing, indicators, for example those having star appearance, or flashing indicators which change relative to other indicators as can be appreciated by those skilled in the art.

Referring back to FIGS. 3A and 3B, while the object's sign is growing (i.e. 201) as between FIGS. 3B and 3A, the other signs 202 to 204, in the layout of FIGS. 3A and 3B are being updated accordingly as to avoid any overlap or occlusion of signs and objects as shown. In case the user switches selected sign to another one (not shown), then the previously growing sign (201) will be set back to its original default size and another one or the signs or thumbnail will show the growing process. In one embodiment, the user can also select or preselect the other signs or thumbnails to be removed once a selection is made. These may reappear should the user wants to make another selection. In this way the signs and thumbnails will not be always visible to increase usability and entertainment enjoyment. In another embodiment, at the moment an action is triggered and selection made, other the signs and/or thumbnails that are not related to the selected object will be removed immediately. The central region or area 200 may also be removed from the display (and possibly undergo display later depending on the use case just being triggered). In this way, as discussed, at least in one embodiment the need for the user to have the required amplitude of movement such as by user's head, movement, gestures or body will be minimized. The relationship between trigger interaction and selection based on interactivity with the real/virtual object(s) will allow a more natural and user friendly system. Moreover, with the help of user selectability and the triggering of the items selected from a user point of view on a scene, items can be easily chosen even when they appear to be fully or partially occluded (especially when an item is occluded by another) from user's current viewpoint. In this way, according to one embodiment, as soon as object(s) of interest is identified and selected, thumbnails and signs will then be removed. In one embodiment, any object in the scene can also be selected to be controlled in the same way by the user, whether real or virtual in nature. Once the selection process is completed and the user no longer needs to use the selected item for any action, in one embodiment, the user will be simply returning to the multiple sign display arrangement of FIGS. 2A and 2B. In other embodiment, the returning of the user to the menu can be handled in other manners as can be appreciated by those skilled in the art. For example, they may be triggered by user making other selections to return back to this status.

The invention claimed is:

1. A head mounted device comprising a display, wherein the device comprises or is configured to be connected to a processor operative to perform:

determining a user's field of view and a center of the user's field of view based on output of a sensor;

rendering images for output to the display, each said image including at least one object, a plurality of signs that are selectable and a non-selectable object, each of said signs corresponding to an object in the user's field of view, the rendering of images including switching positions of the non-selectable object and a given sign and altering a first display attribute of the given sign of the plurality of displayed signs based on determining that the user's field of view is centered on the given sign; and selecting the given sign based on determining that the user's field of view remains centered on the given sign for an amount of time exceeding a threshold.

2. The device of claim 1, wherein the rendering includes rendering the image to display objects in the user's field of view simultaneously with the plurality of signs corresponding to the selectable objects.

3. The device of claim 1, wherein said signs are converging around the central object without overlapping.

4. The device of claim 1, wherein the rendering of images further comprises, altering a second display attribute of the given sign other than the first display attribute based on the selecting the given sign.

5. The device of claim 1, wherein said processor is further configured to perform:
deselecting the given sign after selecting the given sign based on determining that a center of the user's field of view has shifted away from the selected given sign.

6. The device of claim 1, wherein the device includes a microphone and a motion sensor configured to register a user selection through at least one movement, voice or movement and voice.

7. The device of claim 1, wherein the device includes an interaction area configured to register said user selection through touch.

8. The device of claim 4, wherein the device further includes a touch interaction area configured to register said user selection through touch.

9. The device of claim 1, wherein said display is configured to display graphical images on at least one rendering screen in proximity to an eye of the user, said rending screen mechanically coupled to an eyeglass frame wearable by the user.

10. The device of claim 1, wherein the device has a motion sensor, a microphone and a touch interaction area configured to capture user input through movement, voice or touch, respectively.

11. The device of claim 1, wherein said signs are thumbnails having at least one object names and images of objects.

12. A head mounted device comprising:
user interface means for receiving user in form a of voice, movement or touch; and
means for displaying images in processing communication with said user interface means, wherein the device comprises or configured to be connected to a processor operative to perform:
determining a user's field of view and a center of the user's field of view based on output of a sensor;
rendering images for output to the means for displaying, each said image including at least one object, a plurality of signs that are selectable and a non-selectable object, each of said signs corresponding to an object in the user's field of view, the rendering of images including switching positions of the non-selectable object and a given sign and altering a first display attribute of the given sign of the plurality of displayed signs based on determining that the user's field of view is centered on the given sign; and
selecting the given sign based on determining that the user's field of view remains centered on the given sign for an amount of time exceeding a threshold.

13. The device of claim 12, wherein said means for displaying is configured to display graphical images on at least one rendering screen in proximity to an eye of the user, said rending screen mechanically coupled to an eyeglass frame.

14. A method of item selection using a head mounted device, comprising:
determining a user's field of view and a center of the user's field of view;
rendering images for display, each said image including one or more objects, a plurality of signs each corresponding to a selectable object in the user's field of view and a non-selectable object, the rendering of images including switching positions of the non-selectable object and a given sign and altering a first display attribute of the given sign of the plurality of displayed signs based on determining that the user's field of view is centered on the given sign; and
selecting the given sign based on determining that the user's field of view remains centered on the given sign for an amount of time exceeding a threshold.

15. The method of claim 14, wherein said signs are thumbnails having at least one object names and images of objects.

16. The device of claim 1, wherein said non-selectable object has a central position in the user's field of view and is following, with a delay, the center of the user's field of view when said user's field of view is moving.

17. The device of claim 1, wherein said non-selectable object is an empty region or a pointer.

* * * * *